No. 779,403. Patented January 10, 1905.

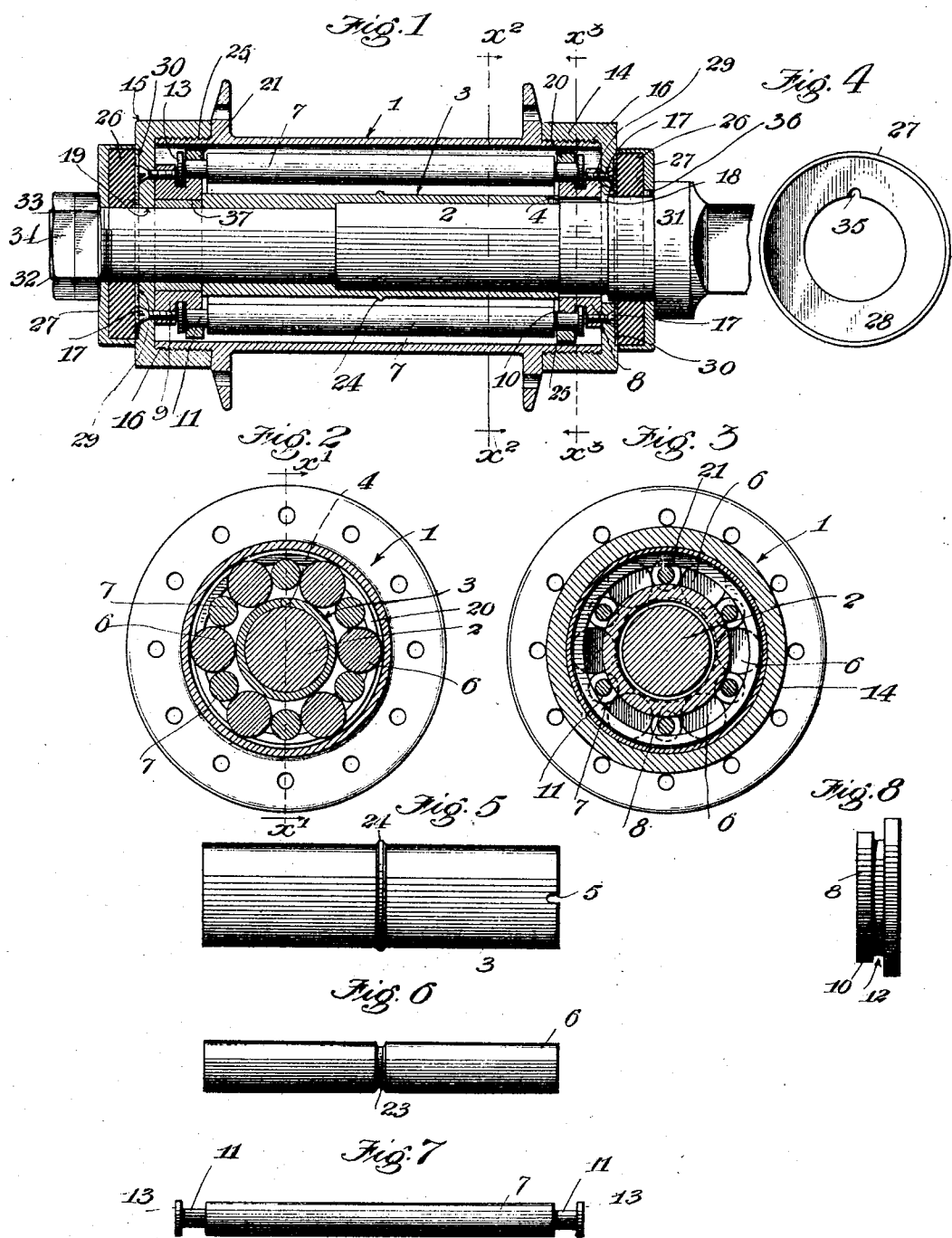

UNITED STATES PATENT OFFICE.

DELOS ALLEN, OF LOS ANGELES, CALIFORNIA.

ANTIFRICTION JOURNAL-BOX.

SPECIFICATION forming part of Letters Patent No. 779,403, dated January 10, 1905.

Application filed February 18, 1904. Serial No. 194,123.

*To all whom it may concern:*

Be it known that I, DELOS ALLEN, a citizen of the United States, residing at Los Angeles, in the county of Los Angeles and State of California, have invented certain Improvements in Antifriction Journal-Boxes, of which the following is a specification.

This invention relates to improvements in antifriction journal-boxes disclosed in Patent No. 388,238, granted to me August 21, 1888, wherein a plurality of antifriction-rollers are arranged between the axle and the cylindrical bearing, with separating-rollers between said antifriction-rollers and disks at each end of the box upon which these separating-rollers travel, means being provided for retaining these separating-rollers in contact with said disks.

An object of this invention is to provide an antifriction journal-box constructed of comparatively few strongly-interlocked and otherwise-united parts easily assembled and taken apart, but which cannot accidentally come apart or be disarranged while either on or off the shaft or axle.

Another object is to provide a simple form of journal-bearing in which a sleeve member of the box is fixed against rotation on the axle or journal, and the other parts are all so united as to rotate or revolve around the sleeve with a minimum amount of friction.

Provision is made by simple and inexpensive construction to exclude dust and to construct and dispose the parts so as to secure great strength with minimum weight and to avoid wearing of parts.

In carrying out this invention I provide a journal-box comprising collars, an outer member and means thereon for retaining the collars therein, a sleeve held between the collars and extending from one to the other, antifriction-rollers between the collars corresponding in length to the sleeve, separating-rollers interlocking with the collars, and rings around the separating-rollers and interlocking therewith to hold them interlocked with the collars. By this construction a strong light roller journal-box suitable for the hub of a light carriage-wheel may be made, and the construction is adapted for the hubs of any kind of vehicle and combines great strength and lightness with high antifriction and long-wearing qualities. I also provide a simple and convenient construction whereby the parts are prevented from shifting and moving or rotating in a wrong direction.

The accompanying drawings illustrate the invention.

Figure 1 is a longitudinal section on line $X' X'$ in Fig. 2. Fig. 2 is a transverse section on the line $X^2 X^2$ in Fig. 1. Fig. 3 is a transverse section on the line $X^3 X^3$ in Fig. 1. Fig. 4 is an inside end view of one of the gasket-caps. Fig. 5 is a side elevation of the interior journal-sleeve. Fig. 6 is a side elevation of one of the antifriction-rollers. Fig. 7 is a side elevation of one of the separating-rollers. Fig. 8 is a side elevation of one of the supporting-collars for the separating-roller.

It will be understood that the invention is applicable in connection either with journal-boxes for rotating shafts or with rotating boxes or hubs for non-rotary axles.

In the drawings the invention is illustrated as applied to an axle and to the wheel-hub or bearing rotating thereon. 1 designates such hub or generally the outer cylindrical bearing member of a journal-box, and 2 designates the axle or generally the inner journal member or shaft. A sleeve 3 fits on said axle or journal member and is connected therewith so that it cannot rotate relatively thereto—for example, by means of a projection, as a pin or key 4, on the axle engaging in a slot 5 in said sleeve. The sleeve 3 constitutes the inner bearing member of the journal-box, the slot 5 and pin 4 being at the inner end of the axle-bearing. The sleeve is detachable from the axle, as hereinafter set forth. A series of antifriction-rollers 6 are arranged between the inner and outer bearing members 1 3, these rollers being of a size to contact simultaneously with both the inner and outer members and form an antifriction-roller bearing between them. A series of separating-rollers 7 are arranged between successive rollers 6, so as to roll in contact with said rollers 6 and prevent contact of the latter with each other.

At the respective ends of sleeve 3 are provided collars 8 9, provided with annular flanges or tracks 10, upon which roll reduced portions or necks 11 of the respective rollers 7, and annular grooves 12 to receive the heads or flanges 13 at the ends of said rollers. These collars are attached to and supported by caps 14 15, which are interiorly screw-threaded at 16 to engage over corresponding screw-threaded ends 25 of the hub or outer shell 1, the collars being secured to the respective caps 14 and 15 by screws 17 passing through holes in said caps and screwing into said collars. The caps 14 and 15 have central openings 18 19, which fit over the corresponding portions of the central shaft or journal 2, and thereby center the collars 8 9 and the series of separating-rollers 7. Rings 20 21 are provided at the ends of these rollers, said rings surrounding the entire series of rollers and engaging with the reduced portions 11 thereof to hold the same in rolling contact with the flanged portions 10 of the collars 8 and 9. To hold the antifriction-rollers from longitudinal displacement, they may be provided with grooves 23 engaging a peripheral flange 24 on the sleeve 3. A thimble 37 may be placed within the collar 9, or this space may be occupied by an extension of the sleeve.

At each end of the box I prefer to provide dust-proof end bearings, which may consist of gaskets or washers 26, of fiber or other suitable material, supported by end caps 27, which are recessed, as at 28, to contain said washers. Each of the caps 14 15 may be recessed, as at 29, to receive a dust-proof packing or felt washer 30, against which the end-bearing washer 26 bears. The central axle shaft or journal 2 may have a collar or flange 31 and a screw portion 32, receiving a nut 33, the box as a whole being held between the said flange 31 and nut 33, the outer face of one end cap 27 bearing against the flange 31 and the outer face of the other end cap 27 bearing against the nut 33.

34 designates a jam-nut for the nut 33.

It is desirable to prevent rotation of the inner end cap 27, and to this end it may be provided with a notch 35 engaging with a projection, as a pin 36, on the axle member 2.

On removing the fastening-nuts 33 and 34 the outer end cap 27 may be slipped off and the bearing then removed as a whole from the axle, the sleeve 3 slipping off of the axle along with the bearing and serving to hold the antifriction-rollers in position in the bearing. The bearing may therefore be made up or assembled separately from the axle and put in place or taken off without any disarrangement of its parts.

The interlocking rib and groove portions 24 and 23 of the sleeve and antifriction-roller members 3 and 6 serve to retain the antifriction-rollers in proper longitudinal position on the sleeve and prevent rubbing of the ends of said rollers against the collars at each end of the sleeve.

It will be seen that in assembling the parts in the position shown, with the separating-rollers 7 engaging by their annular necks with the outwardly-extending flanges 10 of the collars 8 and 9 and with the encircling rings 20 and 21, it is necessary that the above parts be assembled before the outer bearing member and the end caps 14 and 15 are put in place, and as it is desirable that the said collars should be attached to rotate with said end caps, so as to minimize the friction, I provide means for attaching said collars to said end caps, which are accessible at the outside of said caps, said means consisting of the screws 17, whose outer ends are exposed at the outside of the caps.

The manner of assembling the device is as follows: The sleeve 3 and collars 8 and 9 are held in the hand or upon any suitable means in approximately the relative position shown, and the separating-rollers 7 are placed around the sleeve and collars, but bunched to one side instead of distributed uniformly around same, so as to enable the rings 20 and 21 to be slipped over and upon the annular necks of the rollers 7. The antifriction-rollers 6 are then inserted one at a time, the separating-rollers 7 being gradually pushed asunder for that purpose until the circular series is completed. The parts thus assembled are slipped into the outer bearing member, and the end caps 14 and 15 are secured in place on said member. The screws 17 are then put in place to fasten the caps 14 and 15 to the collars 8 and 9, and the bearing may then be slipped on or off the axle and handled as an independent article without any danger of disarrangement of its parts. The inner sleeve and the outer bearing member hold the antifriction-rollers from inward or outward movement, and the caps engaging with the outer bearing member and by their attached collars with the internal sleeve prevent longitudinal slip of the parts on one another.

It is obvious that while the collars 8 9 are fastened to the caps by screws 17 there is no possibility of the caps unscrewing by reason of the intermediate rollers 7 interlocking with the collars, and also that the washers 26, held by caps 27, at once exclude dust and prevent the screws 17 from unscrewing.

What I claim is—

1. The combination of a central journal and a sleeve detachably mounted thereon, said sleeve and journal being provided with means for preventing relative rotation, a collar at each end of the sleeve and engaging the sleeve, an outer bearing member, a series of antifriction-rollers around said sleeve, said sleeve and antifriction-rollers being provided with interengaging rib and groove means to prevent relative longitudinal movement thereof, separating-rollers arranged between said antifriction-rollers, each separating-roller having an annular neck at each end for bearing on said collars, rings around the separating-rollers for engaging said necks, and a cap at each end of the outer bearing member, detachably secured to said outer bearing member and detachably secured to said collars by means accessible from the outside of the caps.

2. The combination with a central journal member and a sleeve member, one of said members being provided with a pin and the other with a slot for engaging said pin for detachably connecting and preventing relative rotation of said members, a collar at each end of the sleeve and engaging the sleeve, an outer bearing member, a series of antifriction-rollers around said sleeve, said sleeve and antifriction-rollers being provided with interengaging rib and groove means to prevent relative longitudinal movement thereof, separating-rollers arranged between said antifriction-rollers, each separating-roller having an annular neck at each end for bearing on said collars, rings around the separating-rollers for engaging said necks, and a cap at each end of the outer bearing member, detachably secured to said outer bearing member and detachably secured to said collars by means accessible from the outside of the caps.

3. The combination of a central journal and a sleeve detachably mounted thereon, said sleeve and journal being provided with means for preventing relative rotation, a collar at each end of the sleeve and engaging the sleeve, an outer bearing member, a series of antifriction-rollers around said sleeve, said sleeve and antifriction-rollers being provided with interengaging rib and groove means to prevent relative longitudinal movement thereof, separating-rollers arranged between said antifriction-rollers, each separating-roller having an annular neck at each end for bearing on said collars, rings around the separating-rollers for engaging said necks, and a cap at each end of the outer bearing member detachably secured to said outer bearing member and detachably secured to said collars by screws extending from the outside of the caps through the caps and into said collars.

4. The combination, with a spindle provided with a shoulder and two projections, of a sleeve on the spindle, one end of which is recessed and engages with one of the projections, a cylindrical outer member around the sleeve, a cap on each end of the outer member, two caps on the axle, one at each end of the bearing and in engagement with the cap on the outer member, one of which rests against said shoulder and is recessed and engages with the other projection on the spindle, a bearing-washer in each cap on the axle and engaging with the respective cap on the outer member, nuts for holding said sleeve and caps in position, antifriction and spacing rollers between the sleeve and the outer member, and means for holding said rollers in position.

5. A journal-box comprising collars, an outer member and means thereon for retaining the collars therein, a sleeve held between the collars, and extending from one to the other, antifriction-rollers between the collars corresponding in length to the sleeve, separating-rollers interlocking with the collars, and rings around the separating-rollers and interlocking therewith to hold them interlocked with the collars.

6. A journal provided with a projecting stop, collars around the journal, an outer member and means thereon for retaining the collars therein, a sleeve held between the collars and extending from one to the other and furnished at one end with a recess to engage the stop on the journal, antifriction-rollers between the collars, corresponding in length to the sleeve, separating-rollers interlocking with the collars, rings around the separating-rollers and interlocking therewith to hold them interlocked with the collars, means to prevent the collars from rotating, and removable means on the end of the journal detachably holding the parts on the journal.

7. A journal-box comprising an outer member, caps screwed to the ends thereof, collars within the outer member, screws through the caps into the collars respectively, a sleeve between the collars, extending from collar to collar, antifriction-rollers between the collars and the sleeve and outer member, rollers separating the antifriction-rollers and interlocking with the collar, and rings interlocking with the separating-rollers.

In testimony whereof I have signed my name to this specification, in the presence of two subscribing witnesses, at Los Angeles, in the county of Los Angeles and State of California, this 2d day of February, 1904.

DELOS ALLEN.

Witnesses:
ARTHUR P. KNIGHT,
JULIA TOWNSEND.